(12) United States Patent
Stem et al.

(10) Patent No.: X7949
(45) Date of Patent: Jan. 9, 1834

(54) TANNING, HANDLING HIDES IN THE VATS

(76) Inventors: Samuel Stem; Daniel Wierman

Samuel Stem & Daniel Wierman:

The schedule referred to in these Letters Patent & making part of the same, containing a description in the words of the said Samuel Stem & Daniel Wierman themselves of their Improvement in the mode of Handling Hides in the Vats.

---

Be it known that we Samuel Stem & Daniel Wierman of Mechanicstown Frederick County State of Maryland have made a new & useful improvement in the mode of handling hides in tan vats: which is described as follows. —

The vat is made in the usual manner about nine feet long, six feet wide & four feet deep. — Within this vat is suspended a frame on which the hides are hung on pegs, having a vertical movement, effected by a lever, by which the hides are [illegible] & lowered in the liquor contained in the vat. — The frame is made less than the inside of the vat with triangular pieces of wood secured at its angles which touch the sides of the vat in raising & lowering the frame. — Across the centre of frame is fastened a piece of timber in the centre of which is framed an upright: - having a mortice in its upper end to admit the end of a connecting rod from the lever.

The pins on which the hides are hung are inserted in the end pieces of the frame, inclining outwards. — The lever by which the frame with the hides is raised & lowered, works on a fulcrum framed in the center of a piece of timber or axle tree extending across the vat; on the ends of which are wheels that run upon ways placed on the sides of the vat by which the lever is removed from one vat to another. The short end of the lever is connected with the upright timber of the frame by a connecting rod having a tenon on its end which fits in the mortice in the end of this upright timber & secured

United States Patent Patent No.: X7949 by a key or pin passing thro' them. The axletree and wheels may be made of cast iron or heavy timber. —

The frame may have a rocking motion by balancing a beam upon a cross timber or support placed over the vat - the ends of which beam being connected with the ends of the frame; _ or a swinging motion may be given to the frame by suspending it on hinges or bolts from the centre of the frame & vat. —

The frame may also have a horizontal movement by making grooves in the sides of the vats in which the frame moves backwards & forwards: in this case the frame must be made considerably smaller than the vat to allow of this movement.

What we claim as our invention is the before described mode of handling hides in tan vats & the combination of machinery to effect the same as before described.

Witnesses
Wm P. Elliot
Geo. Carer

Samuel Stem
Daniel Wierman

Received and Recorded anew Augst 21st 1846

650 w[illegible]